US006989755B2

(12) United States Patent
Matsushita et al.

(10) Patent No.: US 6,989,755 B2
(45) Date of Patent: Jan. 24, 2006

(54) SIGNAL TRANSMISSION DEVICE AND METHOD

(75) Inventors: Nobuyuki Matsushita, Tokyo (JP); Shigeru Tajima, Kanagawa (JP); Yuji Ayatsuka, Tokyo (JP); Tota Hasegawa, Tokyo (JP); Hidenori Karasawa, Tokyo (JP); Eduardo Agusto Sciammarella, Tokyo (JP); Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/258,671

(22) PCT Filed: Feb. 15, 2002

(86) PCT No.: PCT/JP02/01282

§ 371 (c)(1),
(2), (4) Date: Jun. 10, 2003

(87) PCT Pub. No.: WO02/069530

PCT Pub. Date: Sep. 6, 2002

(65) Prior Publication Data
US 2004/0222843 A1 Nov. 11, 2004

(51) Int. Cl.
*G08B 21/00* (2006.01)

(52) U.S. Cl. .................. 340/603; 340/612; 340/618; 340/620; 340/850; 340/852; 324/667; 324/668; 324/707

(58) Field of Classification Search ........... 340/603, 340/618, 620, 612, 850, 852; 324/667, 668, 324/694, 709, 707, 183; 600/372, 396, 509, 600/391, 392, 500
See application file for complete search history.

(56) References Cited

U.S. PATENT DOCUMENTS

| | | | |
|---|---|---|---|
| 3,964,051 A | | 6/1976 | Gilstrap, Jr. |
| 4,187,489 A | | 2/1980 | Silberg |
| 4,878,043 A | * | 10/1989 | Heusquin et al. ........... 340/521 |
| 5,386,196 A | * | 1/1995 | Jones et al. ................. 324/667 |
| 5,675,259 A | * | 10/1997 | Arndt et al. ................ 324/642 |
| 5,880,364 A | * | 3/1999 | Dam ............................ 73/149 |
| 5,928,141 A | * | 7/1999 | Castelli ...................... 600/372 |

FOREIGN PATENT DOCUMENTS

| | | |
|---|---|---|
| EP | 0 229 631 | 7/1987 |
| GB | 2 163 029 | 2/1986 |
| JP | 6-308252 | 11/1994 |
| JP | 7-212268 | 8/1995 |
| JP | 7-235895 | 9/1995 |
| JP | 8-65220 | 3/1996 |
| JP | 9-103414 | 4/1997 |
| WO | WO 99 00679 | 1/1999 |

* cited by examiner

*Primary Examiner*—Hung Nguyen
(74) *Attorney, Agent, or Firm*—Frommer Lawrence & Haug LLP; William S. Frommer; Thomas F. Presson

(57) ABSTRACT

A signal transmitting apparatus which makes exchanging information when pouring a liquid possible. A container body 201 of a transmitter side container 20 holds an electrically conductive liquid 402. A display 306 for confirming data reception is attached to a container body 211 of a receiver side container 21. The container body 201 and the container body 211 are electrically connected at a predetermined impedance by the liquid 402. Because digital data is modulated by a carrier of approximately 10 MHz, an electromagnetic field is generated. In particular, a return line 404 due to an electromagnetic near field is generated, and communications from the transmitter side container 20 to the receiver side container 21 becomes possible.

3 Claims, 9 Drawing Sheets

(a)

(b)

SIGNAL TRANSMISSION DEVICE AND METHOD

TECHNICAL FIELD

The present invention relates to liquid containers which exchange information when receiving liquid.

BACKGROUND ART

Hitherto, a method using the human body as a transmission path and transmitting and receiving video signals by contact has been known (Japanese Unexamined Patent Application Publication No. 7-170215). In this method, a signal communications path is formed with the human body, which is an electrical conductor, as a main communications path and an electromagnetic near field as a return communications line.

The inventors of the present invention have further developed the foregoing technology and have conducted research so that information can be exchanged using ionizable liquid as the main communications line, resulting in the present invention.

DISCLOSURE OF INVENTION

In view of the foregoing circumstances, it is an object of the present invention to provide a technology for easily exchanging information using an ionic liquid or electrically conductive liquid.

According to the present invention, in order to achieve the foregoing objects, a signal transmitting apparatus includes a modulator for modulating an electrical signal; a first electrode connected to the modulator; means for bringing the first electrode into direct or electrostatic contact with an electrically conductive liquid; a second electrode for making direct or electrostatic contact using the liquid as a medium; and demodulation means connected to the second electrode. The signal propagates through the liquid.

With this arrangement, signals can be exchanged using a liquid as a transmission path.

The means for bringing the first electrode into direct or electrostatic contact with the electrically conductive liquid includes, for example, a liquid container, such as a cup, for receiving liquid or a liquid container, such as a tank, which is a liquid supply source. By providing such a liquid container with the first electrode, the liquid and the electrode can be directly or indirectly connected with each other.

The second electrode also comes into contact with the liquid. For example, the liquid container, such as a cup into which the liquid is poured, a cup for receiving the original liquid, or a tank which is a liquid supply source, is provided with an electrode.

Modulation and demodulation can be performed by employing various methods, such as a frequency modulation (frequency shift keying) method, an amplitude modulation (amplitude shift keying) method, a phase shift keying method, and an amplitude phase shift keying method.

In a more specific example, a first liquid container includes signal generating means; a modulator for modulating an electrical signal from the signal generating means; an electrode connected to the modulator; and a container body for supporting the electrode. A second liquid container includes a container body; an electrode supported by the container body; a demodulator for demodulating a modulated signal supplied to the electrode; and means for processing the demodulated electrical signal. A transmission path is formed when an electrically conductive liquid is poured from either container to the other, and an electrical signal is transmitted from one container to the other.

The foregoing aspects of the present invention and other aspects of the present invention are described in the claims and illustrated in detail using the following embodiments.

BEST MODES FOR CARRYING OUT THE INVENTION

Embodiments of the present invention will now be described.

[First Embodiment]

Figure 1:
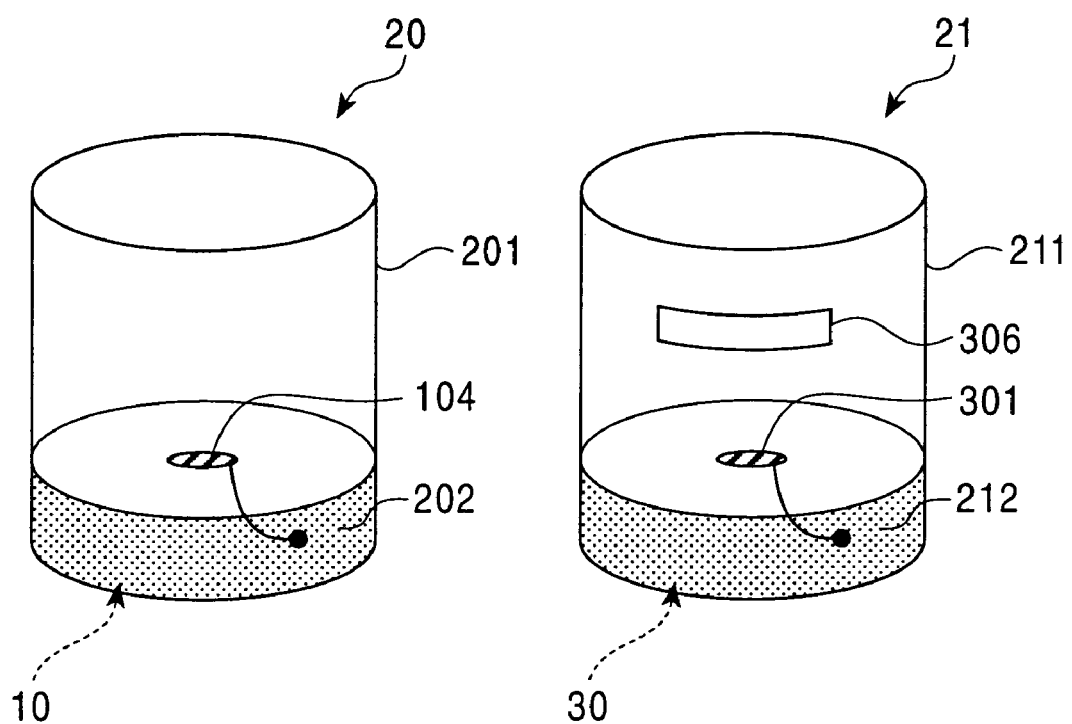
FIG. 1 is a diagram illustrating a transmitter side container and a receiver side container according to a first embodiment of the present invention.

A first embodiment of the present invention will now be described. The first embodiment exchanges information when transferring a liquid from one container (for example, a cup) to another. FIG. 1 shows a transmitter side container 20 and a receiver side container 21. In this drawing, the transmitter side container 20 includes a container body 201. The container body 201 includes an electrode 104 and a transmission circuit section 10 (see FIG. 2). The transmission circuit section 10 and a battery (not shown) are encased in a bottom section 202 indicated by the dotted hatching. The receiver side container 21 includes a container body 211. The container body 211 includes an electrode 301, a display 306, and a reception circuit section 30. The reception circuit section 30 and a battery (not shown) are encased in a bottom section 212 indicated by the dotted hatching.

In this example, an ionizable liquid (which is not shown in FIG. 1; see liquid 402 in FIG. 4) is held in the container body 201 of the transmitter side container 20. As described below, a signal transmission path is formed by pouring a liquid from the container body 201 to the other container body 211, and information is thus exchanged.

Figure 2:
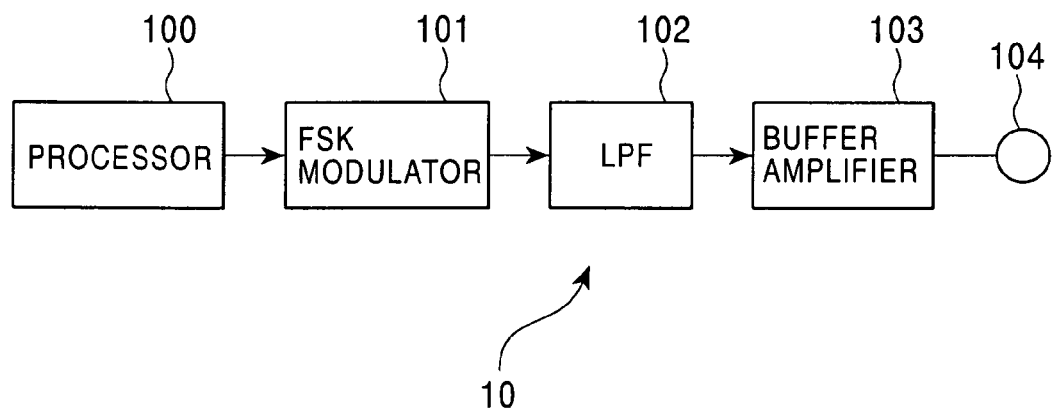
FIG. 2 is a block diagram describing a circuit section related to the transmitter side container of the first embodiment.

FIG. 2 shows the configuration of the transmission circuit section 10 of the transmitter side container 20. In this drawing, the transmission circuit section 10 includes a processor (microprocessor) 100, an FSK (frequency shift keying) modulator 101, a low-pass filter 102, and a buffer amplifier 103. An output signal from the buffer amplifier 103 is applied to the electrode 104. A digital signal generated by the processor 100 is modulated by the FSK modulator 101 using two carriers (for example, 10 MHz and 14 MHz). Of this signal, only the fundamental wave is amplified by the low-pass filter 102 using the buffer amplifier 103. This output is connected to the electrode 104. As described above, the transmission circuit section 10 is incorporated in, for example, the container 20. The electrode 104 is attached to the bottom section 202 of the container body 201.

Figure 3:
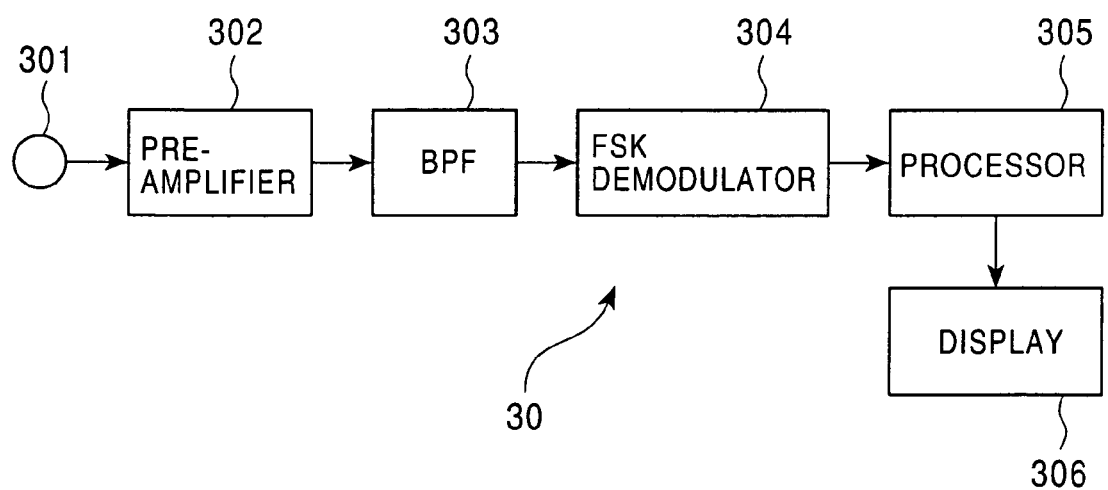
FIG. 3 is a block diagram describing a circuit section related to the receiver side container of the first embodiment.

FIG. 3 shows the reception circuit section 30 of the receiver side container 21. In this drawing, the reception circuit section 30 includes a pre-amplifier 302, a band-pass filter 303, an FSK demodulator 304, a processor (microprocessor) 305, and the like. An electrical signal supplied to the electrode 301 is amplified at the pre-amplifier 302, band-limited at the band-pass filter 303, restored to digital data at the FSK demodulator 304, and is then supplied to the processor 305. The processor 305 displays the received information on the display 306. This display 306 is provided on a side surface of the receiver side container 21, and can be viewed by a user.

Figure 4:
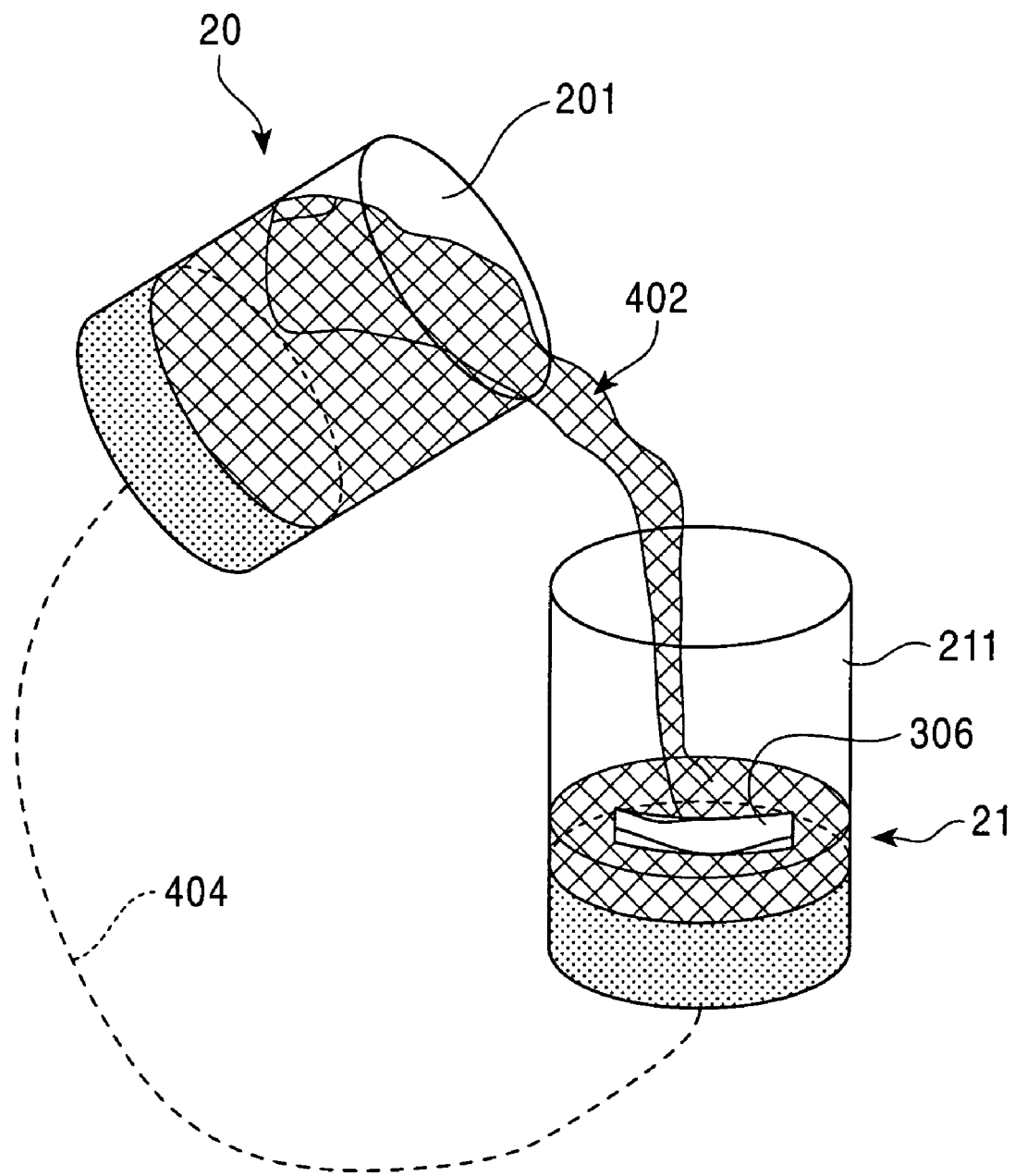
FIG. 4 is an illustration describing the operation of the first embodiment.

FIG. 4 shows signal transmission using the transmitter side container 20 and the receiver side container 21. In FIG. 4, the container body 201 of the transmitter side container 40 holds an electrically conductive liquid 402 (something which contains ions within, such as water containing impurities, salt water., and beverages such as wine, whiskey, and beer. Needless to say, it may also be a normal conductor such as mercury). This liquid 402 is indicated by the cross hatching. The display 306 for data reception confirmation is attached to the container body 211 of the receiver side container 21. In the state shown in FIG. 4, the container body 201 and the container body 211 are electrically connected by the liquid 402 with a predetermined impedance. Under the conditions shown in FIG. 4, even if electrically connected, the return line of the communication path is unclear, and it seems impossible to perform communications. However, in the present system, since the digital data is modulated by a carrier of approximately 10 MHz, an electromagnetic field is generated, and in particular, a return line 404 by an electromagnetic near field component is generated, and communications is made possible.

Figure 5:
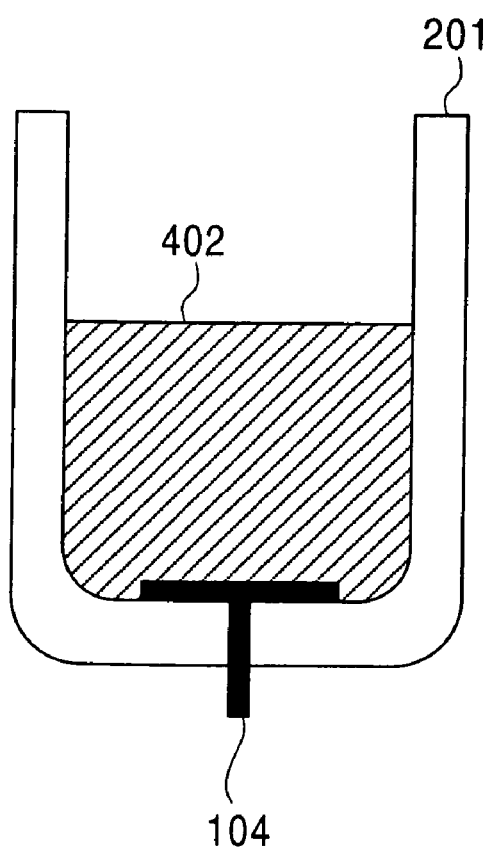
FIG. 5 includes diagrams describing an electrode of the first embodiment.
Figure 5:
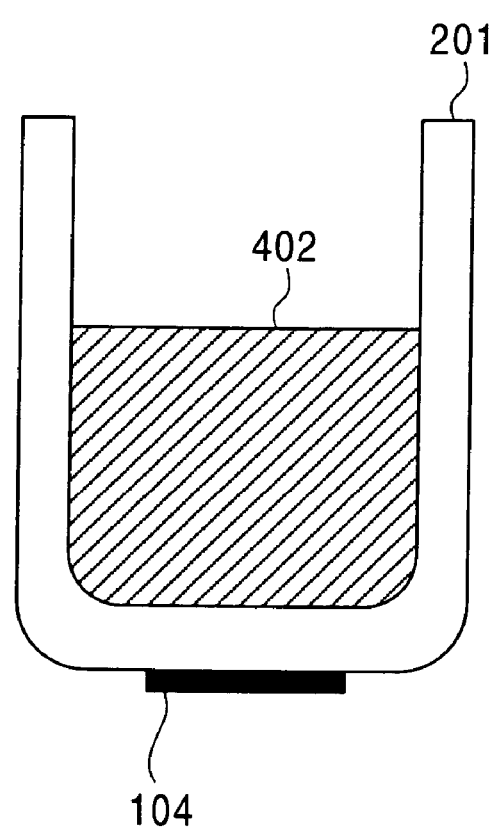

The electrode 104 (301) attached to the container body 201 (211) can be attached, as shown in FIG. 5(a), so as to be immersed directly in the liquid. As shown in FIG. 5(b), the electrode 104 (301) may also be provided so as to form a capacitor with the electrode 104 (301) and the container body 201 (211) of a dielectric material relative to the liquid 402. Since the signal supplied to the electrode is an alternating signal of approximately 10 MHz or greater, if, for example, the capacitance of the capacitor can be set to be approximately 100 pF, the impedance becomes approximately 150 Ω, which is sufficiently low.

In FIG. 4, a case in which the liquid is poured from the transmitter side container 20 into the receiver side container 21 is shown. However, since a communications path is also formed when the liquid is poured from the receiver side container 21 into the transmitter side container 20, transmission in the direction opposite to the flow of the liquid may be performed.

[Second Embodiment]

Figure 6:
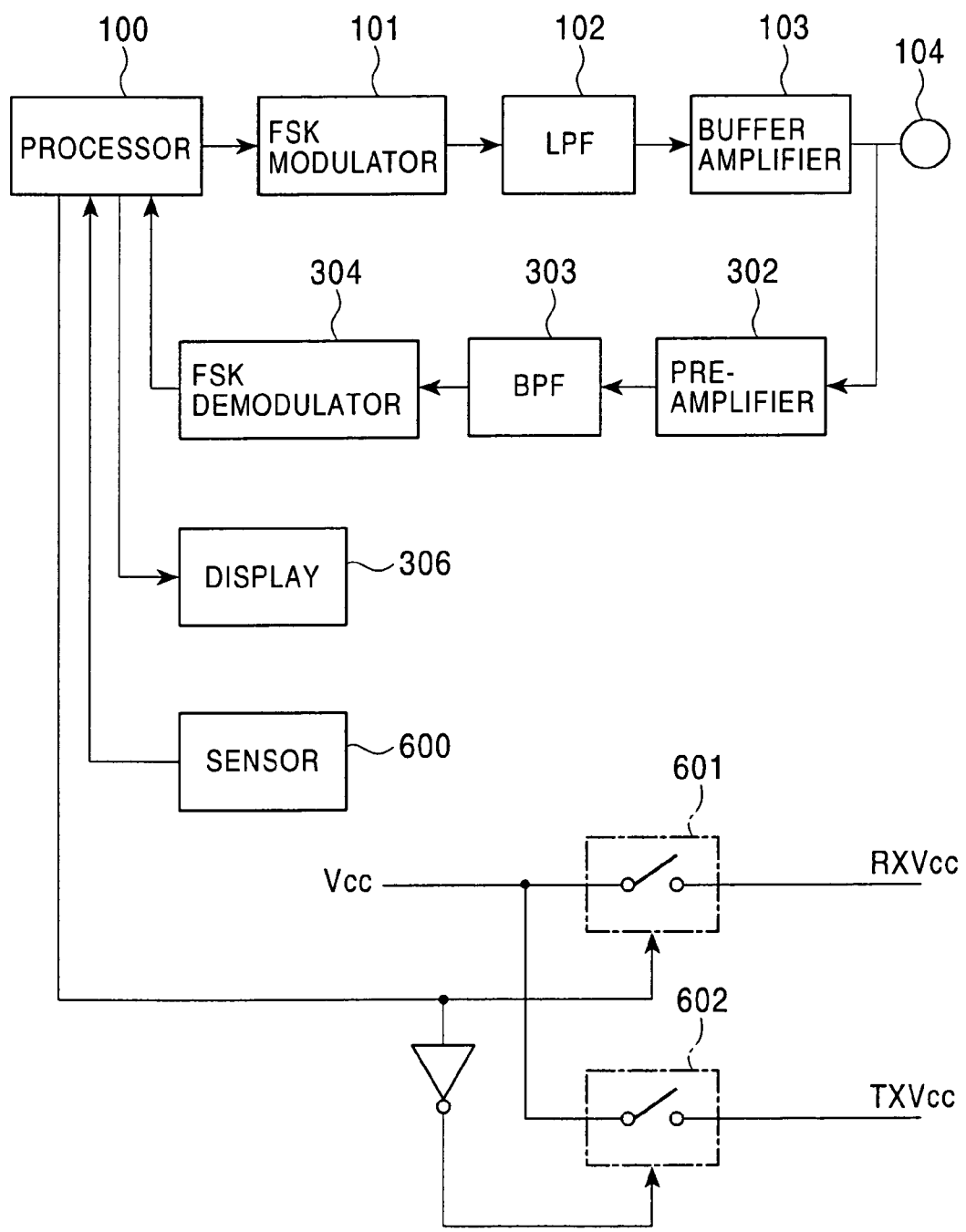
FIG. 6 is a block diagram describing a circuit section according to a second embodiment of the present invention.

A second embodiment of the present invention will now be described. In the second embodiment, a container having both a transmitter function and a receiver function is used. The exterior appearance of the container of this embodiment is substantially the same as the transmitter side container 20 or the receiver side container 21 shown in FIG. 1. However, a display 306 is provided on a side surface of the container. Basically, the circuit configuration is one in which the circuit of FIG. 2 and the circuit of FIG. 3 are integrated by sharing a processor 100. However, a tilt sensor 600 is provided. In FIG. 6, portions corresponding to those in FIG. 2 or FIG. 3 are given corresponding reference numerals.

The tilt sensor 600 detects whether or not the container is tilted. When the tilt is equal to or greater than a predetermined value, the container is set in transmission mode. Otherwise, the container is in reception mode. The amount of tilt is detected by the processor 100, and hysterisis is provided for switching between transmission and reception. Therefore, a carrier used in FSK modulation may be shared (even in cases of plural containers), and the apparatus may be simplified. In contrast, because it is undesirable for the power source for its own transmission circuit to be operating in reception mode, switching is performed by switches 601 and 602. Needless to say, it is also possible to simply switch the FSK modulator 101 and the FSK demodulator 304 without controlling the power source for the transmission/reception circuitry. In this embodiment, for purposes of power saving as well, the power source itself is switched. In the drawing, RXVcc is a power supply line to the reception side circuit, and TXVcc is a power supply line to the transmission side circuit.

Besides the method using the tilt sensor 600 as the sensor wherein transmission mode is entered when the container is tilted, methods for detecting the fact that the container is held by a person using a pressure sensor or a capacitance sensor (in practice, changes in frequency of an oscillation circuit in which capacitance and inductance are combined, or a voltage induced via capacitance) is detected are viable.

Alternatively, methods in which a micro switch attached to the bottom of the container, thus detecting the fact that the container is lifted, and alteration of transmission/reception modes using a mode alternating switch explicitly provided on the container are naturally possible as well.

[Third Embodiment]

Figure 7:
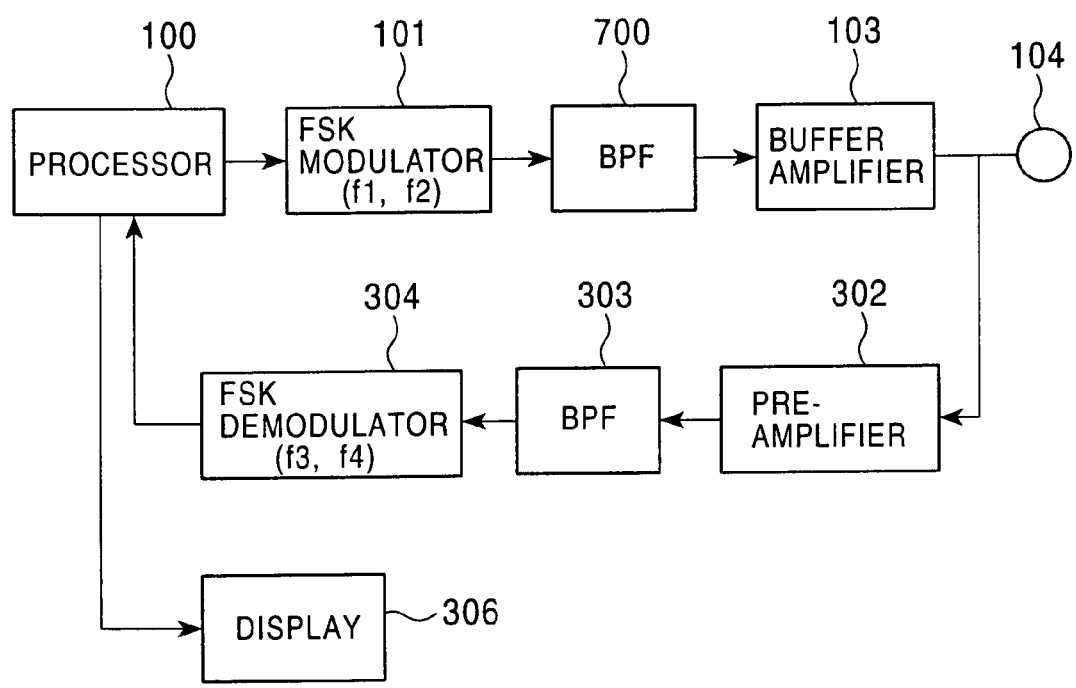
FIG. 7 is a block diagram describing a circuit section according to a third embodiment of the present invention.

A third embodiment of the present invention will now be described. In this embodiment, different frequencies are used for carriers of the transmission/reception circuitry, and a full duplex method is employed. FIG. 7 shows this embodiment in its entirety. In this drawing, portions corresponding to those in FIGS. 2, 3, or 6 are given corresponding reference numerals. In FIG. 7, frequencies f1 and f2 (for example, 10 MHz and 14 MHz) are used on the transmission side, and f3 and f4 (for example, 18 MHz and 22 MHz) are used on the reception side, and each is separated by a band-pass filter 700 or 303. In this method, transmission/reception are distinguished from other containers by the frequency bands as shown below:

TABLE 1

| Container | Transmission Frequency | Reception Frequency |
|---|---|---|
| Container A | f1 and f2 | f3 and f4 |
| Container B | f3 and f4 | f1 and f2 |

Figure 8:
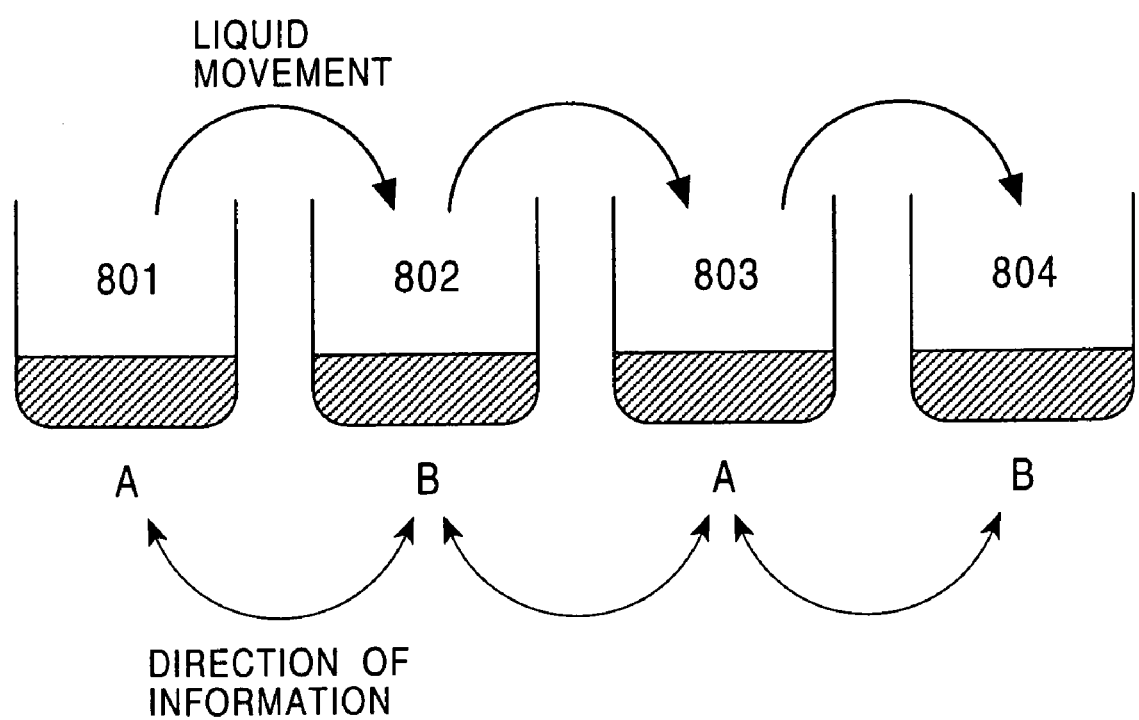
FIG. 8 is a diagram describing the third embodiment.

Even when full duplex communications is performed at the same time as pouring liquid from one container to another, a minimum of two types of containers (indicated by A and B) is sufficient (FIG. 8). However, in the present embodiment, simultaneously transferring a liquid from one or more containers (for example, pouring from 802 and 801 into 802) is forbidden.

[Fourth Embodiment]

Figure 9:
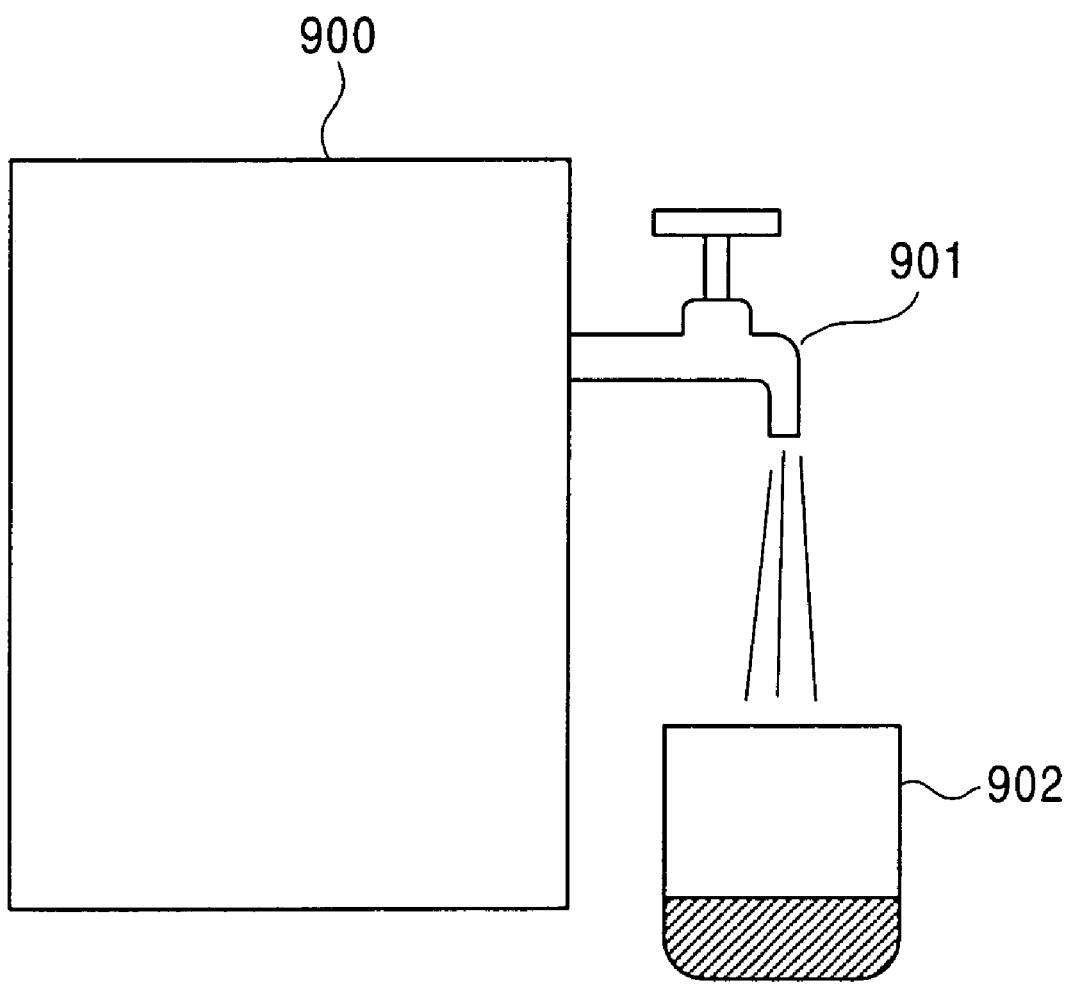
FIG. 9 is a diagram illustrating a fourth embodiment of the present invention in its entirety.

A fourth embodiment of the present invention will now be described. In this embodiment, information is exchanged when a liquid is poured from a liquid supply apparatus (tank or the like). FIG. 9 shows this embodiment in its entirety. In this drawing, a liquid supply apparatus 900 includes means for performing information communications which uses a liquid as a medium, and means for supplying the liquid. The liquid supply apparatus 900 includes a faucet-cum-electrode 901. A container 902 is a container comprising communications means similar to that of the receiver side container 21 shown in FIG. 3. In this embodiment, the liquid is supplied from the liquid supply apparatus 900 to a container. At the same time, data is simultaneously supplied to the container 902. (However, since communications may be two-way as well, communications by handshake is naturally possible, and the detection of the data is not one way). In this embodiment, for example, the price of the liquid supplied through the faucet-cum-electrode 901 is charged to the container 902. Therefore, when the container is returned, the account can be settled automatically via a network. Naturally, since the calculation means and memory means are included in the container, when poured a plurality of times, the total price can be stored by the container. Further, there may naturally be a plurality of faucet-cum-electrodes 901. By assigning an ID to the liquid supply apparatus 900 and by supplying the ID information to the container 902 side, different processings for various types of liquids may be performed using a plurality of liquid supply apparatuses 900.

[Fifth Embodiment]

Figure 10:
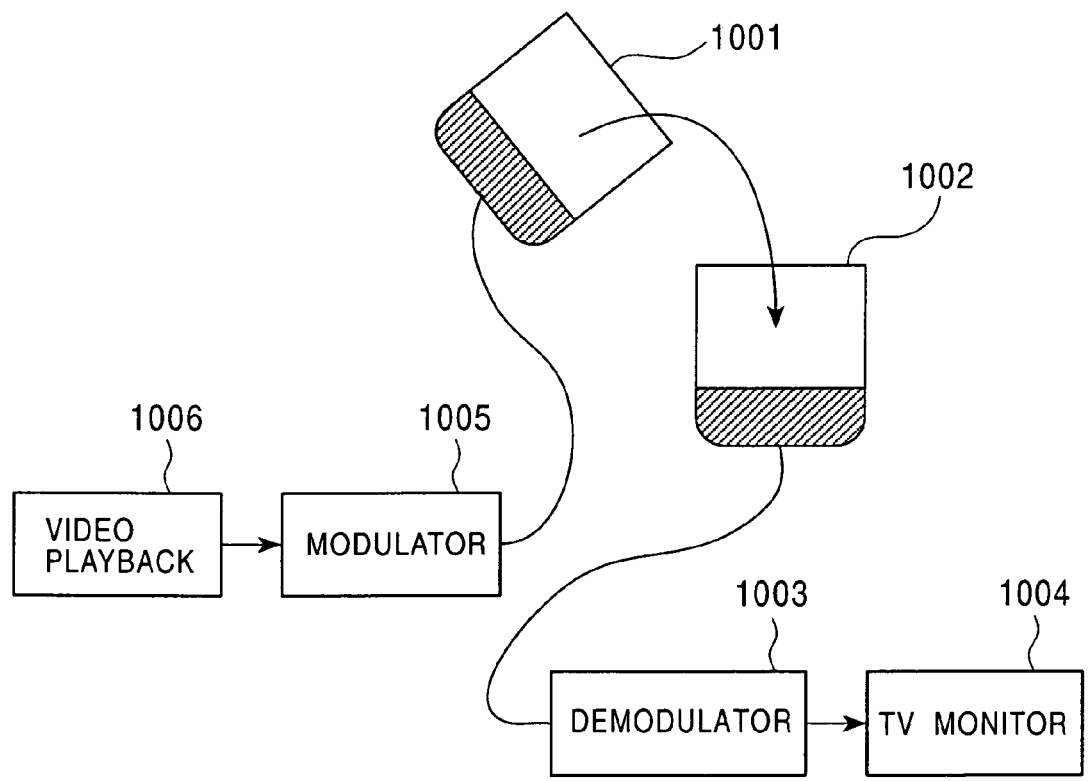
FIG. 10 is a diagram illustrating a fifth embodiment of the present invention in its entirety.

A fifth embodiment of the present invention will now be described. This embodiment is one in which an analog signal is transmitted. FIG. 10 shows this embodiment. In this drawing, signal transmission means 1005 including an FM modulator, a buffer amplifier and the like, and video playback means 1006 for supplying a video signal thereto are connected to a container 1001. As the video playback means 1006, for example, a portable DV videocassette player/recorder, a video camera, or a video recording/reproducing apparatus using a hard disk may be used. 1001, 1005, and 1006 may be integrated, or connected by wires. Alternatively, as described in Japanese Unexamined Patent Application Publication No. 7-170215, a transmission path may be formed via the human body. A container 1002 is a signal receiver side container, and a demodulator 1003 (including a pre-amplifier, a filter, and the like) is connected. A video signal monitor 1004 is connected to the output. When an appropriate liquid is poured from the container 1001 into the container 1002 in such a system, a video signal is transmitted for that period only, and is observed using the monitor 1004. Needless to say, a video signal memory may be prepared on the memory 1004 side, and in the absence of a video signal, this memory may be read. In addition, instead of using video signals, using audio signals or video-audio signals at the same time are also possible (in this case, modulation band splitting is performed).

In analog signal transmission, instead of using FSK modulation, normal FM modulation is used.

INDUSTRIAL APPLICABILITY

As described above, according to the present invention, the following advantages are achieved:

1. Transmission of electrical information using liquid, which hitherto has not been used for transmitting electrical signals, is made possible;

2. A new method in which information is transferred with the transfer of liquid may be realized; and 3. An information transmitter using liquid as a transmission path may be realized.

The invention claimed is:

1. A liquid container comprising:
   signal generating means;
   a modulator for modulating an electrical signal from said signal generating means;
   an electrode connected to said modulator; and
   a container body for supporting said electrode,
   wherein said liquid container is one of a number of types of liquid containers, and
   wherein said modulator modulates the electrical signal in a manner unique to each type of liquid container.

2. A signal transmitting system for exchanging a liquid between a first liquid container comprising:
   signal generating means;
   a modulator for modulating an electrical signal from said signal generating means;
   a first electrode connected to said modulator;
   a first container body for supporting said first electrode; and
   a demodulator for demodulating a modulated signal externally supplied to said first electrode; and
   means for processing the demodulated electrical signal; and
   a second liquid container comprising:
   a second container body;
   a second electrode supported by said second container body;
   a demodulator for demodulating the modulated signal supplied to the second electrode;
   and means for processing the demodulated electrical signal;
   signal generating means; and
   a modulator for modulating and supplying to said second electrode an electrode signal from said signal generating means,
   whereby a signal is transmitted from said second liquid container to said first liquid container, and
   whereby a signal is transmitted from said first liquid container to said second liquid container by way of the liquid.

3. A signal transmitting method for exchanging a liquid between a first liquid container and a second liquid container, said method comprising the steps of:
   modulating an electrical signal from a signal generating means in the first liquid container;
   connecting a first electrode to a modulator in the first liquid container;
   supporting said first electrode with a first container body in the first liquid container;
   supporting a second electrode with a second container body in the second liquid container;
   demodulating the modulated signal supplied to the second electrode in the second liquid container;
   processing the demodulated electrical signal in the second liquid container;
   demodulating a modulated signal externally supplied to said first electrode in the first liquid container;

processing the demodulated electrical signal in the first liquid container;

generating a second signal in the second liquid container;

modulating and supplying to said second electrode an electrode signal obtained from a signal generating means in the second liquid container, whereby a signal is transmitted from said first liquid container to said second liquid container by way of the liquid, and whereby a signal is transmitted from said second liquid container to said first liquid container.

* * * * *